(12) United States Patent
Cherryhomes et al.

(10) Patent No.: US 10,994,187 B2
(45) Date of Patent: May 4, 2021

(54) SWING ALERT SYSTEM AND METHOD

(71) Applicant: X Factor Technology, LLC, Carlsbad, CA (US)

(72) Inventors: Kenneth Roger Cherryhomes, Carlsbad, CA (US); Mark Werner, Bellevue, WA (US)

(73) Assignee: X Factor Technology, LLC, Carlsbad, CA (US)

(*) Notice: Subject to any disclaimer, the term of this patent is extended or adjusted under 35 U.S.C. 154(b) by 0 days.

(21) Appl. No.: 16/926,440

(22) Filed: Jul. 10, 2020

(65) Prior Publication Data

US 2020/0338429 A1 Oct. 29, 2020

Related U.S. Application Data

(60) Division of application No. 16/831,677, filed on Mar. 26, 2020, which is a continuation of application No. 16/008,956, filed on Jun. 14, 2018, now abandoned.

(60) Provisional application No. 62/521,956, filed on Jun. 19, 2017.

(51) Int. Cl.
*A63B 69/00* (2006.01)
*A63B 71/06* (2006.01)
*G09B 19/00* (2006.01)

(52) U.S. Cl.
CPC ...... *A63B 71/0622* (2013.01); *A63B 69/0002* (2013.01); *G09B 19/0038* (2013.01); *A63B 2069/0008* (2013.01); *A63B 2071/0625* (2013.01); *A63B 2220/40* (2013.01)

(58) Field of Classification Search
CPC ............ A63B 69/0002; A63B 69/0008; A63B 2071/0625; A63B 71/0622; A63B 2220/40

USPC ....... 473/422, 451, 453, 459, 455, 468, 456; 434/247, 257
See application file for complete search history.

(56) References Cited

U.S. PATENT DOCUMENTS

| 4,461,477 A | 7/1984 | Stewart |
| 4,513,365 A | 4/1985 | Franz et al. |
| 4,545,576 A * | 10/1985 | Harris ............ A63B 69/00 340/323 R |
| 4,563,005 A | 1/1986 | Hand et al. |
| 4,657,250 A | 4/1987 | Newland et al. |

(Continued)

OTHER PUBLICATIONS

U.S. Appl. No. 16/008,956, Non-Final Office Action dated Dec. 3, 2019, 8 pages.

(Continued)

*Primary Examiner* — Mitra Aryanpour
(74) *Attorney, Agent, or Firm* — Perkins Coie LLP

(57) ABSTRACT

A swing alert system disposed about a baseball setup that includes a pitcher and a batter, with one or more swing alert device that determine a speed and position of a ball along a flightpath of the ball pitched by the pitcher, the flightpath extending from the pitcher to a hitting location target proximate to the batter; determine a time when the ball will reach the hitting location target based at least in part on the determined speed and position of the ball along the flightpath; and generate a swing alert while the ball is traveling along the flightpath and before the ball reaches the hitting location target. The swing alert is generated at a time determined based at least in part on the determined time when the ball will reach the hitting location target and a defined swing time associated with the batter.

19 Claims, 8 Drawing Sheets

(56) References Cited

U.S. PATENT DOCUMENTS

| | | | |
|---|---|---|---|
| 4,834,375 A * | 5/1989 | Elstein | A63B 24/00 273/446 |
| 4,915,384 A | 4/1990 | Bear | |
| 5,008,839 A | 4/1991 | Goodwin et al. | |
| 5,443,260 A | 8/1995 | Stewart et al. | |
| 5,464,208 A | 11/1995 | Pierce | |
| 5,479,008 A | 12/1995 | Nishiyama et al. | |
| 5,509,649 A | 4/1996 | Burhrkuhl | |
| 5,868,578 A * | 2/1999 | Baum | A63B 24/0021 434/247 |
| 6,292,130 B1 | 9/2001 | Cavallaro et al. | |
| 6,709,351 B2 | 3/2004 | Hori | |
| 7,335,116 B2 | 2/2008 | Petrov | |
| 7,575,526 B2 * | 8/2009 | Husband | A63B 24/0021 473/422 |
| 7,892,116 B2 | 2/2011 | Kellogg | |
| 8,465,376 B2 | 6/2013 | Bentley | |
| 8,535,180 B1 | 9/2013 | Husband | |
| 8,702,516 B2 | 4/2014 | Bentley et al. | |
| 8,905,855 B2 | 12/2014 | Fitzpatrick et al. | |
| 8,941,723 B2 | 1/2015 | Bentley et al. | |
| 8,944,928 B2 | 2/2015 | Kaps et al. | |
| 8,994,826 B2 | 3/2015 | Bentley | |
| 9,033,810 B2 | 5/2015 | Bentley | |
| 9,235,765 B2 | 1/2016 | Bentley et al. | |
| 9,261,526 B2 | 2/2016 | Bentley et al. | |
| 9,320,957 B2 | 4/2016 | Bentley | |
| 9,396,385 B2 | 7/2016 | Bentley et al. | |
| 9,604,142 B2 | 3/2017 | Bentley et al. | |
| 9,646,199 B2 | 5/2017 | Bose et al. | |
| 10,076,698 B2 | 9/2018 | Spivak et al. | |
| 10,109,061 B2 | 10/2018 | Bose et al. | |
| 10,456,645 B2 | 10/2019 | Joo et al. | |
| 10,456,653 B2 | 10/2019 | Thornbrue et al. | |
| 10,549,166 B1 | 2/2020 | Mueller et al. | |
| 10,607,349 B2 | 3/2020 | Bose et al. | |
| 2004/0014538 A1 | 1/2004 | Bennett | |
| 2005/0077085 A1 | 4/2005 | Zeller et al. | |
| 2008/0182686 A1 * | 7/2008 | Kellogg | A63B 69/0002 473/451 |
| 2010/0298958 A1 * | 11/2010 | Connelly | A63B 71/06 700/93 |
| 2012/0108367 A1 | 5/2012 | Betances | |
| 2015/0019135 A1 | 1/2015 | Kacyvenski et al. | |
| 2015/0258402 A1 * | 9/2015 | Bynum | A63B 69/0002 473/453 |
| 2015/0373306 A1 * | 12/2015 | Flores | H04N 21/6175 348/157 |
| 2017/0216695 A1 | 8/2017 | Schlagenhauf | |
| 2018/0272214 A1 * | 9/2018 | Ratner | A63B 69/0002 473/422 |
| 2018/0272221 A1 | 9/2018 | Sundararajan et al. | |
| 2018/0361223 A1 * | 12/2018 | Cherryhomes | A63B 71/0622 473/422 |
| 2020/0222782 A1 | 7/2020 | Cherryhomes et al. | |
| 2020/0230482 A1 | 7/2020 | Thornbrue et al. | |

OTHER PUBLICATIONS

U.S. Appl. No. 16/831,677, Non-Final Office Action dated Jun. 26, 2020, 12 pages.

U.S. Appl. No. 16/831,677, Non-Final Office Action dated Nov. 13, 2020, 9 pages.

* cited by examiner

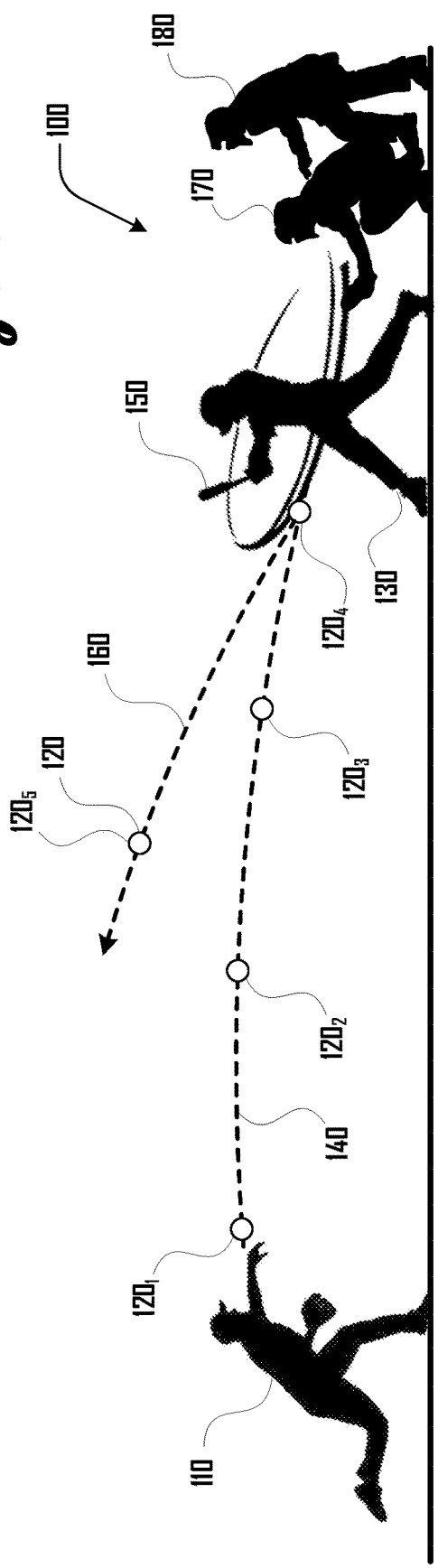

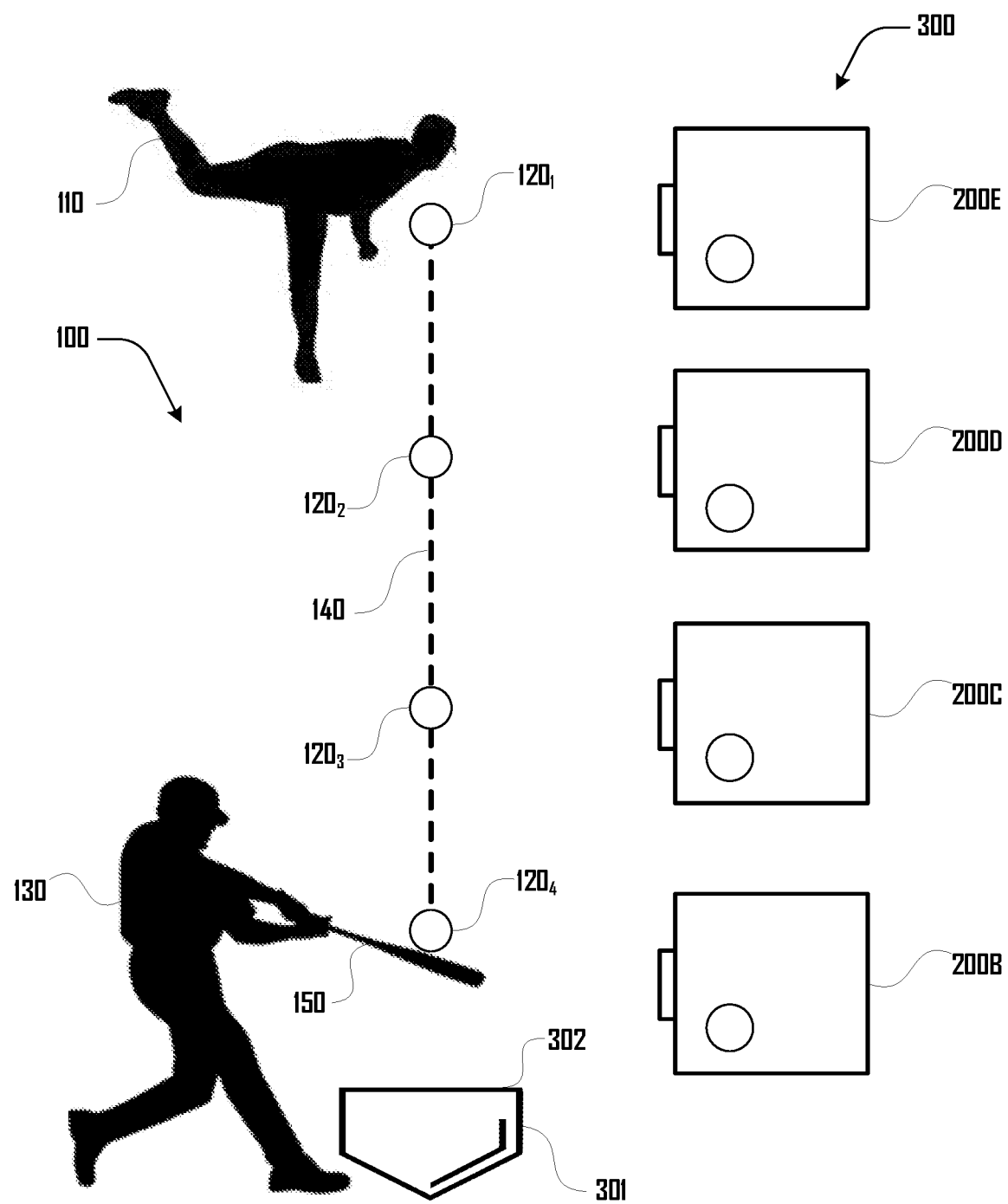
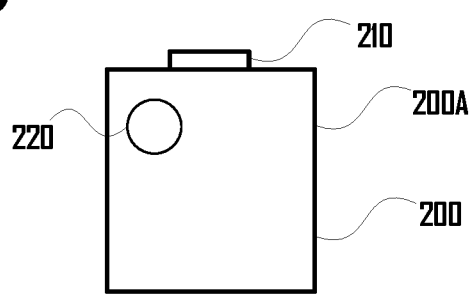
Fig. 3

SWING ALERT SYSTEM AND METHOD

CROSS-REFERENCE TO RELATED APPLICATION(S)

This application is a divisional of U.S. patent application Ser. No. 16/831,677, filed Mar. 26, 2020, now pending, which is continuation of U.S. patent application Ser. No. 16/008,956, filed Jun. 14, 2018, which is a non-provisional of and claims the benefit of U.S. Provisional Application No. 62/521,956, filed Jun. 19, 2017, the disclosures of which are hereby incorporated herein by reference in their entireties and for all purposes.

BRIEF DESCRIPTION OF THE DRAWINGS

FIGS. 1a and 1b illustrate a baseball setup that includes a pitcher and a batter with FIG. 1b illustrating a baseball traveling along a first flightpath from the pitcher to the batter.

FIG. 3 illustrates an example embodiment of a swing alert system that comprises a plurality of swing alert devices disposed about a baseball setup.

Figure 2:
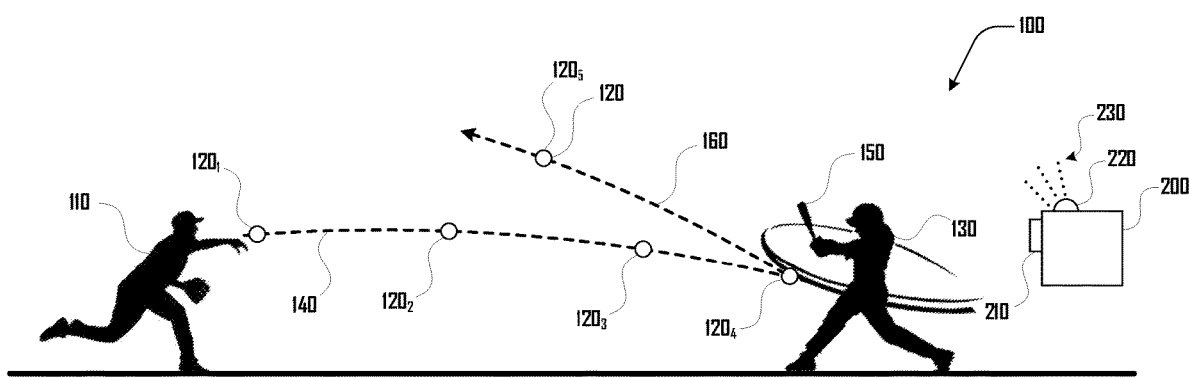
FIG. 2 illustrates a baseball setup that includes a swing alert device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Embodiments of the present disclosure comprise a novel system or device that captures and processes timing swing events which can use one or more sensors, a signaling unit and the like. Captured and stored batter data comprised of stride time, swing speed, swing delay metrics, and the like can be coupled and correlated with characteristics of a pitched ball, which can then be processed (e.g., via a processor implementing an algorithm). The system or device can generate an alert such as an audio, visual or haptic alert to signal a batter when to act upon a pitched ball. Such a stride alert or swing alert can be timed so that a bat swung by the batter arrives at a designated point simultaneous to when the ball arrives at the designated meeting point or area.

Various embodiments include a method and a device or system of devices that when used together can aid in the ability of a batter to more consistently hit baseballs. The system and/or devices as described herein can implement one or more methods that configure the system or device to provide a signal to the batter as to when to initiate a swing of a bat and/or a stride of a swing in order to meet a pitch of a given speed, placement and/or pitch type. The system or device can be configured to measure the various desirable metrics of a baseball pitch and the swing of the batter. The baseball pitch, swing of the batter and timing feedback can be provided (e.g., via an interface of a user device or the like) for aid in batter training.

In various examples, a device or system can use data such as pitch speed captured at release or along a flight path and presumed pitch speed decay by distance of travel, distance to home plate, and swing delay time to calculate the time at which the hitter needs to start swinging to hit the pitched baseball. Swing timing and swing kinematics of a batter can be captured, which in some embodiments can include swing speed, swing time, swing delay time, time to contact with the ball, bat angle, bat orientation, bat speed, hand speed, swing orientation, and the like.

Turning to FIGS. 1a and 1b, a baseball setup 100 is illustrated that includes a pitcher 110 that, as shown in FIG. 1b, throws a baseball 120 toward a batter 130 with the baseball 120 traveling along a first flightpath 140 from the pitcher 110 to the batter 130. The batter 130 can swing a bat 150 and strike the ball 120 at a position along the first flightpath 140 to cause the ball 120 to travel along a second flight path 160.

For example, as shown in FIG. 1b, the pitcher can release the ball 120 at a first release position $120_1$, with the ball 120 traveling along the first flightpath 140 including a second and third position $120_2$, $120_3$ between the pitcher 110 and batter 130. At a fourth contact position $120_4$, the batter 130 can hit the ball 120 with the bat 150, which causes the ball 120 to travel along the second flight path 160, including a fifth position $120_5$.

It should be appreciated that the ball 120 can take a continuous first flightpath 120 between a pitcher 110 and a batter 130 with the ball 120 assuming all positions between the first and fourth positions $120_1$, $120_4$ and the second and third positions $120_2$, $120_3$ are only examples of infinite discrete positions that ball 120 assumes along the first flightpath 140. Additionally, the example second flightpath 140 of FIG. 1b should not be construed to be limiting on the wide variety of first flightpaths 140 that can be generated between a pitcher 110 and a batter 130. For example, the pitcher 110 can release the ball 120 at various positions, with various velocities, and with various ball spins, which can generate different first flight paths 140 between the pitcher 110 and batter 130. Pitch types such as a fastball, breaking ball, changeup, the like, can be used to generate different flight paths 140 between the pitcher 110 and batter 130.

Similarly, the example second flightpath 160 should not be construed to be limiting on the wide variety of second flightpaths 140 that can be generated after a batter 130 hits the ball 120. For example, the second flightpath 140 can be different based one variable such as swing speed of the bat 150 at contact with the ball 120; angle of the bat 150 at contact with the ball 120, location of contact of the ball 120 along the length of the bat 150, and the like. Also, it should be clear that in some examples the batter 130 may not make contact with the ball 120 and the second flightpath 140 may not be generated. For example, the batter 130 can swing too early, swing too late, swing and miss the ball 120, not swing, or the like.

Additionally, while one example baseball setup 100 is shown in FIGS. 1a and 1b, various other suitable baseball setups can be implemented in accordance with further embodiments. For example, in some embodiments, the pitcher 110 can be replaced with various suitable pitching machines, and in further embodiments, the pitcher 110 or a pitching machine can be absent. Similarly, the example of FIGS. 1a and 1b illustrate a catcher 170 and umpire 180 respectively behind the batter 130, but in various examples, the catcher 170 and/or umpire 180 can be absent.

Also, while various examples discussed herein relate to baseball, it should be clear that the systems and methods discussed herein should be applied to other activities, and therefore the baseball examples should not be construed as limiting. For example, some embodiments can be applied to bat-and-ball sports such as softball or cricket. Further examples can be applied to other suitable activities such as tennis, badminton, shooting, racing, skiing, ski jumping, surfing, football, rugby, volleyball, ping pong, racket ball, squash, and the like. Accordingly, the examples herein should not be construed to be limiting on the wide variety of embodiments that are within the scope and spirit of the present disclosure.

Turning to FIG. 2, a baseball setup 100 is illustrated, which includes a swing alert device 200. The swing alert device 200 can comprise at least one sensor 210 and an alert unit 220, which can be configured to generate an alert 230. In the example of FIG. 2, the swing alert device 200 is shown positioned behind the batter 130, with the at least one sensor 210 having a field of view that includes one or more of the batter 130, the bat 150, at least a portion of the first flightpath 140, the pitcher 110, and the like.

As discussed in more detail herein, in some embodiments, the swing alert device 200 can be configured to identify a pitching event where the pitcher 110 throws a ball 120 toward the batter 130 and the swing alert device 200 can present one or more alerts that indicate to the batter 130 when to swing the bat 150, begin a hitting stride, prepare to swing, and the like. Such one or more alerts can be generated based on a velocity and position of the ball 120 in a flightpath 140 determined by the swing alert device 200. For example, in various embodiments, one or more sensors 210 of the swing alert device 200 can determine a speed, velocity and/or position of the ball 120 in a flightpath 140 during a pitching event and generate one or more alerts 230 via the alert unit 220 to indicate to the batter 130 when the batter 130 should swing at the ball 120 along the flightpath 140.

In various embodiments, the swing alert device 200 can comprise any suitable device or system including a smartphone, laptop computer, tablet computer, wearable computer, gaming device, digital camera, radar gun, rangefinder, and the like. The one or more sensors 210 of the swing alert device 200 can include various suitable sensors including a microphone, camera, RAdio Detection And Ranging (RADAR), Light Detection And Ranging (LIDAR), SOund Navigation And Ranging (SONAR), light gate, optical gate, and the like. In some embodiments, one or more of a microphone, camera, RADAR, LIDAR, SONAR, light gate, optical gate, and the like, can be specifically absent from a swing alert device 200 or system. A camera can include any suitable type of camera, including a visible light camera, infrared camera, ultraviolet camera, thermographic camera, and the like. Additionally, as discussed herein in more detail, in some embodiments, one or more sensors 210 can be disposed external to a swing alert device 200.

The swing alert device 200 can comprise one or more suitable alert units 220 to generate various suitable alerts 230. For example, the one or more alert units 220 can comprise a speaker, haptic alert device, light-generating alert unit (e.g., a lightbulb, light-emitting-diode (LED), and the like). Accordingly, an alert 230 can include various types of alerts that can be perceived or sensed by a user, including sound, light, vibration, applied force, tactile changes, and the like. In some embodiments, any of such examples or types of alert units 220 can be specifically absent from a swing alert device 200. Additionally, as discussed herein in more detail, in some embodiments, one or more alert units 220 can be disposed external to a swing alert device 200.

As shown in the example of FIG. 2, in some embodiments, a swing alert device 200 can be positioned behind a batter 130 in a baseball setup 100, with one or more sensors 210 positioned facing the pitcher 110, batter 130 and/or at least a portion of the flightpath 140 of a ball 120 thrown by the pitcher 110. In various embodiments, the swing alert device 200 can be positioned generally parallel to the flightpath 140 of a ball 120 being thrown by a pitcher 110 as shown in FIG. 2. It should be appreciated that "generally parallel" as discussed herein can relate to non-liner flightpaths 140 of a ball 120, both vertically and horizontally. For example, a flightpath of a ball 120 may not be vertically linear (e.g., as shown in FIGS. 1b and 2) due to gravity and/or may not be horizontally liner based on how the ball 120 is thrown or how the surface of the ball 120 affects the trajectory of the ball 120 (e.g., a curveball pitch). Accordingly, in various embodiments, position of the swing alert device 200 and/or sensors 210 can be defined based on an axis, vertical plane or area extending from the pitcher 110 to a hitting zone of the batter 130 (e.g., relative to home plate 301 shown in FIG. 3). In some examples, a hitting or strike zone of a batter 130 between the knees and shoulders of the batter 130 or an area over home plate 301 extending approximately from the armpits to the knees of a batter 130 when the batter 130 is in a batting position.

In further embodiments, one or more swing alert devices 200 can be positioned generally perpendicular to the flightpath 140 of a ball 120 (e.g., swing alert devices 200B, 200C, 200D, 200E as shown in FIG. 3). However, such examples should not be construed to be limiting on the wide variety of positions that one or more swing alert devices 200 can be positioned relative to a baseball setup 100. For example, if the position of the swing alert device 200 shown in FIG. 2 and the first swing alert device 200A of FIG. 3 are defined as being at 0 degrees, and the second, third, fourth and fifth swing alert devices 200B, 200C, 200D, 200E as shown in FIG. 3 being defined as being at 90 degrees, in further embodiments, one or more swing alert devices 200 can be positioned at various suitable positions including at 10, 20, 30, 40, 50, 60, 70, 80, 100, 110, 120, 130, 140, 150, 160, 170, 180 degrees, or the like, or between a range of any such positions. The position of one or more swing alert devices 200 can be configured to provide for a desirable field of view for sensors 220 of such one or more swing alert devices.

In various embodiments, one or more swing alert devices 200 can be disposed above the ground at various suitable heights to provide a desired field of view for sensors 220 of such one or more swing alert devices (e.g., as shown in FIG. 2). Such a position above the ground can be defined by one or more swing alert devices 200 being mounted on a tripod, mounted on a structure (e.g., a portion of a baseball field), suspended by a line, held by a flying drone, held by a user, and the like.

Turning to FIG. 3, an example embodiment of a swing alert system 300 is illustrated, which comprises a plurality of swing alert devices 200 disposed about a baseball setup 100. To be clear, the example embodiment of FIG. 3 illustrates only one example embodiment and is not limiting on the wide variety of alternative embodiments, some of which are described in further detail herein. For example, in further embodiments, one or more of the swing alert devices 200A, 200B, 200C, 200D, 200E shown in FIG. 3 can be absent.

As shown in FIG. 3, a first swing alert device 200A can be positioned behind the batter 130 and centered about home plate 301 with a field of view that can include the pitcher 110 and at least a portion of a flightpath 140 of a ball 120. The first swing alert device 200A can be oriented generally parallel to the flightpath 140 of the ball 120 as discussed herein. In some examples, having the first alert device 200A in such a position can be desirable to allow for various functionalities such as one or more of determining swing timing and/or swing kinematics of the batter 130; determining pitch timing and/or pitch kinematics of the pitcher 110; identifying a pitching event; determining a speed or velocity of a ball 120; determining an estimated flightpath 140 of the ball 120; determining one or more positions of the ball 120; and the like. In some examples, the first swing alert device 200A can be limited to providing one or more of such functionalities.

A second, third, fourth and fifth alert device 200B, 200C, 200D, 200E can be positioned generally perpendicular to the flightpath 140 of the ball 120 along the length of the flightpath 140, with one or more of the second, third, fourth and fifth alert devices 200B, 200C, 200D, 200E providing various functionalities such as one or more of determining swing timing and/or swing kinematics of the batter 130; determining pitch timing and/or pitch kinematics of the pitcher 110; identifying a pitching event; determining a speed or velocity of a ball 120; determining an estimated flightpath 140 of the ball 120; determining one or more positions of the ball 120; and the like. In some examples, one or more of the second, third, fourth and fifth alert devices 200B, 200C, 200D, 200E can be limited to providing one or more of such functionalities.

For example, in one embodiment, the third and fourth alert devices 200C, 200D can comprise portions of an optical gate that can be used to determine a velocity and position of a ball 120 traveling along a flightpath 140. More specifically, if a distance between the third and fourth alert devices 200C, 200D is known, the time from the ball 120 passing the fourth alert device 200D to passing the third alert device 200C can be used to determine a velocity or speed of the ball 120.

In another embodiment, the fifth alert device 200E can be used to identify a pitch event (e.g., the pitcher 110 throwing or beginning to throw a ball 120); pitch timing and/or pitch kinematics of the pitcher 110; and the like. For example, computer vision associated with a camera or other sensor 220 of an alert device 200 can be used to identify a pitch event, pitch timing of the pitcher 110 and/or pitch kinematics of the pitcher 110. In a further embodiment, the second alert device 200B can be used to identify contact between the ball 120 and the bat 150; swing timing and/or swing kinematics of the batter 130; and the like. For example, computer vision associated with a camera or other sensor 220 of an alert device 200 can be used to identify contact between the ball 120 and the bat 150, swing timing of the batter 130 and/or swing kinematics of the batter 130. In another example, a microphone can identify contact between the ball 120 and the bat 150 based on the sound made when the ball 120 and the bat 150 come into contact.

Additionally, computer vision associated with a camera or other sensor 220 of one or more alert devices 200 can be used to determine a position, velocity, speed, spin, flightpath, velocity at release, projected ball velocity decay, orientation, rotation, and distance of travel to a designated point and/or other characteristics of a ball 120 thrown by a pitcher 110. Similarly, in some embodiments, one or more sensors 220 such as RADAR, LIDAR, SONAR, or the like can be used to determine a position, velocity, speed, spin, flightpath and/or other characteristics of a ball 120 thrown by a pitcher. In one example, the size of known objects (e.g., baseballs and softballs of various sizes) can be used in gauging velocity of such a known object by the change in proximity and or orientation of such an object utilizing a camera. Accordingly, some examples can include a user indicating the identity of an object being pitched to provide for identifying position, speed and/or velocity of the object being thrown.

As discussed herein, a swing alert device system 300 of some embodiments can include more or fewer swing alert devices 200 compared to the example embodiment of FIG. 3. For example, in one embodiment, only the first, second, third and fourth swing alert devices 200 can be present in a swing alert device system 300. In another example, only the third and fourth swing alert devices 200C, 200D can be present in a swing alert device system 300. Swing alert devices 200 of such swing alert device systems 300 can be suitably individually or collectively configured to perform any of the functions described herein.

In various embodiments, information such as position, velocity, speed, spin, flightpath and/or other characteristics of a ball 120 thrown by a pitcher 110 can be used to provide alerts to the batter 130. For example, it can be desirable to provide one or more alerts to a batter 130 regarding when to prepare to swing at a ball 120, when to begin a swing stride to swing at a ball 120, and/or when to swing at a ball 120. Providing such alerts can be useful for training swing timing, swing tempo timing, and the like.

As discussed in more detail herein, determining when to provide such alerts can be based on a determination of when a pitched ball 120 traveling along a flightpath 140 will reach a hitting location target relative to the batter 130, home plate 301, or other location. For example, in some embodiments, a hitting location target can comprise a portion of a plane extending perpendicularly from the ground at a front face 302 of home plate 301. In further embodiments, a hitting location can be offset forward or backward from a portion of a plane extending perpendicularly from the ground at a front face 302 of home plate 301, including being offset by +/− 1 inch, 2 inches, 3 inches, 4 inches, and the like.

A location of a hitting location target can be selected based on various factors, including position of the batter 130 relative to the hitting location target and/or desired contact point between the bat 150 and ball 120 during the swing of the batter 130. For example, moving a hitting location target backward toward the batter 130 can result in the batter 130 hitting the ball earlier in the swing of the batter 130, which can result in the second trajectory 160 of a hit ball 120 (see FIGS. 1b and 2) being toward right field. Moving a hitting location target away from the batter 130 can result in the batter 130 hitting the ball later in the swing of the batter 130, which can result in the second trajectory 160 of a hit ball 120 being toward left field. Accordingly, in various embodiments location of a hitting location target can be selected based at least in part on baseball field training location (e.g., left field, center field, right field).

Although the example, of a hitting location target being defined relative to a monument such as home plate 301 or the front edge 302 of home plate, in further examples, various suitable permanent or temporary ground monuments can be used to define a hitting location target. For example, a ground monument can include a stake, drawn line, or the like. Also, a hitting location target can be defined based on a coordinate location (e.g., GPS location) a body part of a hitter 130 (e.g., the head, torso, hips, leg, arm of the hitter 130), or an article worn by a hitter (e.g., a helmet, shoe, shirt, pants, glasses, bracelet, or the like).

The location of a hitting location target can be identified by one or more swing alert devices 200 or swing alert device systems 300 in various suitable ways. For example, such an identification can be visual (e.g., via a camera), including visual identification of a monument or other reference as discussed herein. In further embodiments, such identification can be based on reporting or interrogation of a device. For example, a device such as an RFID or GPS enabled device can be worn by a batter, disposed at a monument such as home plate, or otherwise positioned to define a location of a hitting location target.

Alerts can be generated and provided to a batter 130 or other user in any suitable way, including a visual alert, sound alert and/or haptic alert. Such an alert can be generated by one or more swing alert devices 200 or other suitable device as discussed in more detail herein. For example, as shown in FIGS. 2 and 3, one or more swing alert devices 200 can include an alert unit 220, which can be configured to generate an alert 230. In some embodiments, an alert device 200 can comprise one or more alert units 220 configured to provide any suitable type of alert 230, and in some embodiments a swing alert device 200 can be without an alert unit 220 and unable to generate an alert 230. For example, in embodiments having a plurality of swing alert devices 200, only one of the plurality of swing alert devices 200 generates an alert, or two or more of the plurality of swing alert devices 200 can generate an alert, with the generated alerts being the same or different among the swing alert devices 200. Additionally, in some embodiments, an alert unit 220 external to a swing alert device 200 can be used to generate an alert 230. Accordingly, the examples shown and described herein should not be construed to be limiting on the wide variety of variations of how alerts can be generated for a batter 130 or other users.

Figure 4:
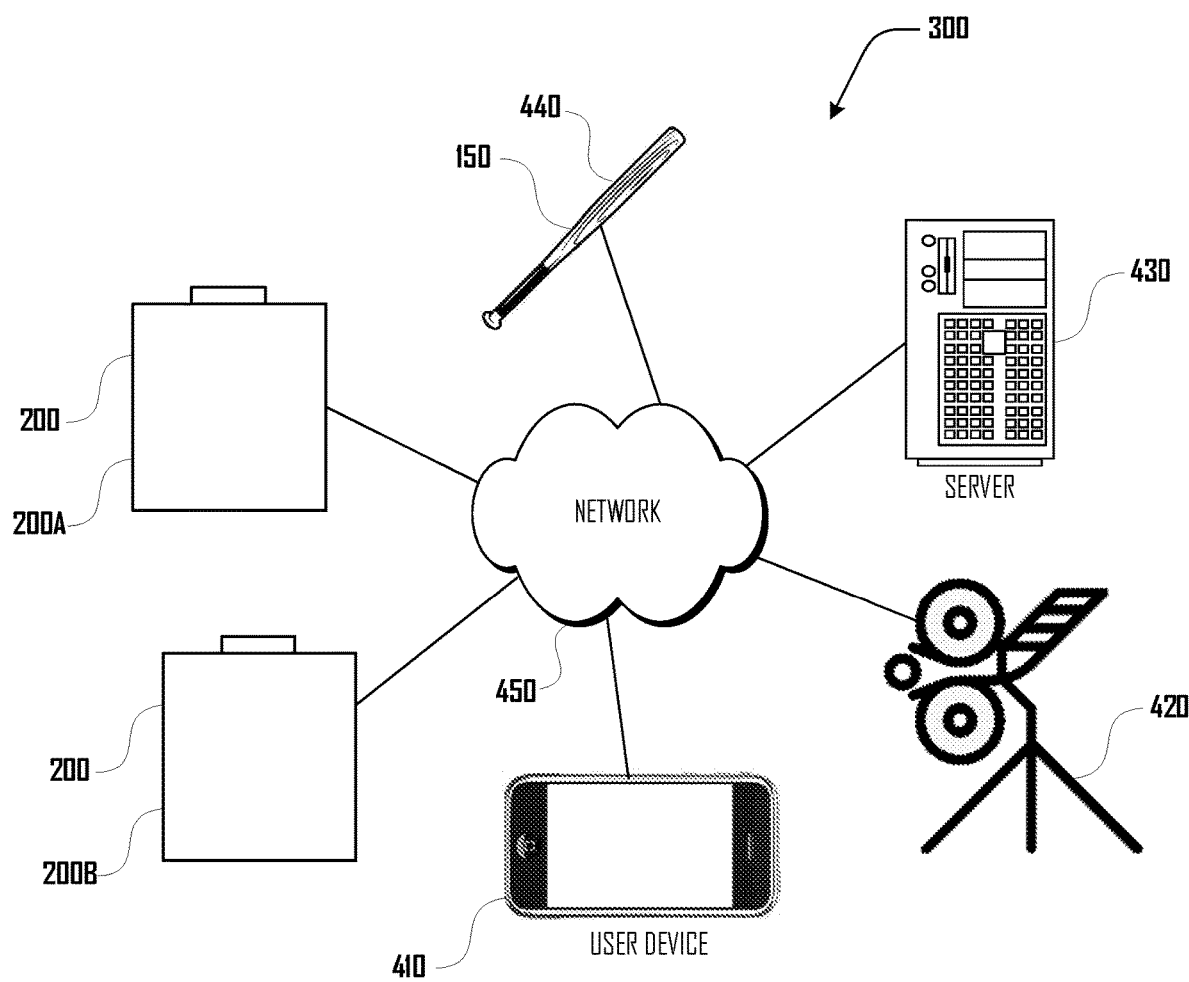
FIG. 4 illustrates another example embodiment of a swing alert system that comprises a first and second swing alert device, a user device, a pitching machine, a server, and a bat device, which are operably connected via a network.

Turning to FIG. 4 another embodiment of a swing alert system 300 is illustrated, which in this example is shown as comprising a first and second swing alert device 200A, 200B, a user device 410, a pitching machine 420, a server 430, and a bat device 440, which are operably connected via a network 450. Although the user device 410 in FIG. 4 is shown as a smartphone, in further embodiments, the user device can comprise a laptop computer, tablet computer, wearable computer, gaming device, digital camera, radar gun, rangefinder, and the like.

The pitching machine 420 can comprise any suitable type of pitching machine having various suitable capabilities. For example, the pitching machine 420 can be configured to pitch balls 120 with a selected speed, spin, pitch type, and the like. As discussed in more detail herein, in some embodiments, the pitching machine 420 can be configured to generate pitches of a selected type upon command.

The server 430 can comprise one or more suitable virtual or non-virtual computing devices that can be configured to act as a server or otherwise perform actions or portions thereof as discussed herein. In some embodiments, a plurality of separate swing alert systems 300 can operably communicate with the server 430. For example, in some embodiments, the server 430 can track and store activity of a plurality of swing alert systems 300; provide processing functionality for a plurality of swing alert systems 300; allow administrator access to a plurality of swing alert systems 300, and the like.

The bat device 440 can comprise various suitable devices including a customized bat 150 that comprises the bat device 440 or a bat device 440 that is configured to removably couple with a conventional bat 150. For example, in some embodiments, the bat device 440 can be removably coupled to any suitable portion of a bat 150 including the knob, grip, handle, end, barrel and the like. In various embodiments, the bat device 440 can comprise one or more alert units 220 configured to generate various suitable types of alerts 230. For example, the bat device 440 can vibrate; generate a sound; or the like, to alert the batter 130 to initiate a swing, to swing, or the like.

Additionally, in some embodiments, the bat device 440 can comprise various suitable sensors that can generate data for use by the swing alert system 300. For example, in some embodiments, the bat device 440 can comprise one or more of an accelerometer, compass, gyroscope, magnetometer, or other suitable positioning device, which can be used to generate data to determine swing timing, swing kinematics, location of a hitting location target, contact of the bat 150 with a ball 120, and the like.

In further embodiments, a device having similar capabilities as a bat device 440 can be part of a swing alert system 300. For example, such a device can be worn by a batter 130 or other user; can be part of a monument such as home plate 301; can be a stand-alone unit; or the like. For example, in one embodiment, the batter 130 can wear glasses, headphones or a headset that provides visual, haptic and/or auditory alerts to the batter 130. In another embodiment, the batter 130 and/or pitcher 110 can wear a glove, shirt, wrist band or pants that provide visual, haptic and/or auditory alerts and can generate motion or position data. In a further embodiment, the ball 120 can comprise such elements or capabilities.

The network 450 can comprise various suitable wired and/or wireless networks including, a Wi-Fi network, a Bluetooth network, a short-range wireless network, a long-range wireless network, a Local Area Network (LAN), a Wide Area Network (WAN), the Internet, and the like. In some examples, portions of the swing alert system 300 can be local to each other or can be remote from each other. For example, in various embodiments, the server can be remote from all other elements of the swing alert system 300.

Although FIG. 4 illustrates one specific example of a swing alert system 300 in accordance with on embodiment, this example should not be construed to be limiting on the wide variety of swing alert systems 300 that are within the scope and spirit of the present disclosure. For example, in further embodiments, elements of a swing alert system 300 such as the swing alert devices 200, user device 410, pitching machine 420, server 430, and bat device 440 can be present in singular, can be present in any suitable plurality and/or can be absent from the swing alert system 300. Additionally, in some embodiments, any of the swing alert devices 200, user device 410, pitching machine 420, server 430, and bat device 440 can be combined or have functions, elements or capabilities of another device.

For example, in one embodiment, the user device 410 can act as a swing alert device 200 with separate swing alert 200 devices being absent. In another embodiment, a pitching machine 420 can act as a swing alert device 200 or a swing alert device can be coupled to a pitching machine 420. In a further embodiment, the pitching machine 420 can be absent with a pitcher 110 in place of the pitching machine 420 to pitch balls 120. In yet another example, the bat device 440 can be absent. In some embodiments a laser gate can be generated by a single device or a plurality of devices.

Accordingly, it should be clear that one or more swing alert systems 300 with a small or large number of elements and with high and low complexity are within the scope and spirit of the present disclosure.

Figure 5:
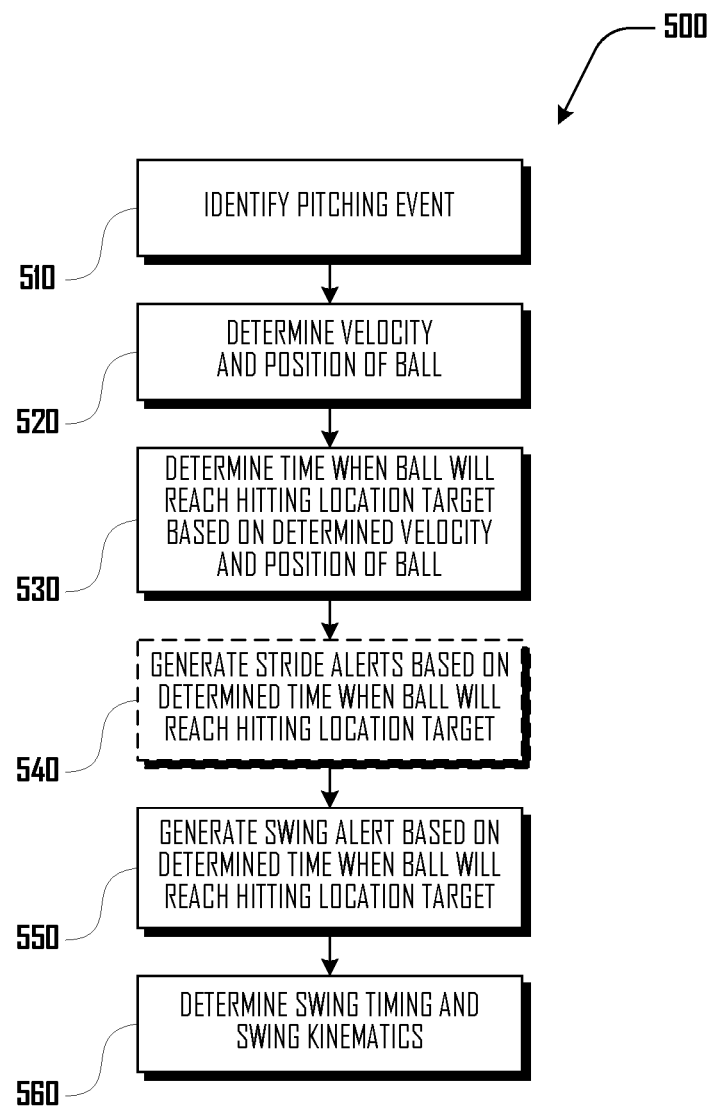
FIG. 5 illustrates a block diagram of a method of generating a swing signal in accordance with an embodiment.

Turning to FIG. 5, a method 500 of generating a swing signal is illustrated. The method 500 beings at 510 where a pitching event is identified. For example, in one embodiment a swing alert device 200 can visually determine (e.g., via a camera) that a pitching event is about to occur or is occurring based on movement of a pitcher 110, identification of a ball leaving the hand of a pitcher 110, and the like. In another embodiment, a pitching machine 420 can indicate that a pitching event is occurring or is about to occur. In a further embodiment, a sensor such as RADAR, LIDAR or SONAR can be used to identify a pitching event based on detection of a ball 120 being within a potential flightpath area.

At 520, a velocity and position of the ball 120 is determined, and at 530, a time when the ball 120 will reach a hitting location target is determined. For example, a position, velocity, speed, spin, flightpath and/or other characteristics of a ball 120 can be determined in one or more ways as discussed herein, and in some embodiments, an average of a plurality of determinations can be used to determine a final determined velocity and position of the ball 120. Such a plurality of determination can come from the same sensor(s) or sensing method, or can come from different sensors and sensing methods. Making such a plurality of determinations can be desirable to improve the accuracy of a determined velocity and location(s) of the ball 120 along a flight path 140, which can improve the accuracy of the determined time when the ball 120 will reach the hitting location target.

With the velocity and position of the ball 120 being determined at one or more locations along the flightpath 140 and with the position of the hitting location target being known, a determination can be made as to when the ball 120 will reach the hitting location target, which can be used as a basis for generating one or more alerts for the batter 130. Accordingly, at 540, a stride alert can be optionally generated based on the determined time when the ball 120 will reach the hitting location target. At 550, a swing alert can be generated based on the determined time when the ball 120 will reach the hitting location target.

For example, a stride alert can be generated to alert the batter 110 to begin a swing stride such that the batter 110 can swing at the ball 120 at a desired time (e.g., based on a swing alert). The swing alert can be generated to alert the batter 110 when to begin a swing so that the bat 150 will be at a desired location to contact the ball 120. In other words, the swing alert can be generated to alert the batter 110 when to begin a swing so that the swing of the batter 110 has progressed to a desired state when the ball 120 reaches the hitting location target such that contact between the ball 120 and bat 150 is likely to occur at a desired time within the swing of the batter 110.

The timing of the stride alert can be at a stride offset time before the determined time when the ball 120 will reach the hitting location target. The stride offset time can determined based on a stride test as discussed in more detail; can be determined based on default stride offset time; and the like. Additionally, the stride offset time can be determined based on variables or conditions such as pitch type, desired hit location on the field, weather conditions, fatigue of the batter 110, and the like. Additionally, as discussed herein, the stride offset time can include a delay to account for a delay in the stride alert being perceived by the batter 110 and acted upon by the batter 110.

The timing of the swing alert can be at a swing offset time before the determined time when the ball 120 will reach the hitting location target. The swing offset time can determined based on a swing test as discussed in more detail; can be determined based on default swing offset time; and the like. Additionally, the swing offset time can be determined based on variables or conditions such as pitch type, desired hit location on the field, weather conditions, fatigue of the batter 110, and the like. Additionally, as discussed herein, the swing offset time can include a delay to account for a delay in the swing alert being perceived by the batter 110 and acted upon by the batter 110.

In one example, and referring to FIG. 3, the stride alert can be generated when the ball 120 is at the second position $120_2$ within the flightpath 140, and the swing alert can be generated when the ball 120 is at the third position $120_3$ within the flightpath 140. In some examples, a stride alert can be absent. However, in further examples, a stride alert can be preset with a swing alert being absent.

Returning to the method 500 of FIG. 5, at 560, swing timing and swing kinematics are determined. For example, swing timing and swing kinematics can be determined based on data from a camera, accelerometer, compass, gyroscope, magnetometer or other suitable sensors as discussed herein. In various embodiments, swing timing and swing kinematics data can be used to provide feedback to the batter 110 and other users on the swing of the batter 110. In some examples, one or both of swing timing and swing kinematics can be used to determine timing of when swing and/or stride alerts are generated.

In various embodiments, one or more of the steps of the method 500 of FIG. 5 can be performed by a swing alert device 200 or one or more elements of a swing alert system 300 including one or more swing alert devices 200, a user device 410, a pitching machine 420, a server 430, and a bat device 440. To perform such steps, a device can comprise a memory storing computer readable instructions that when executed by a processor cause a device to perform such steps or have such functionalities.

Figure 6A:
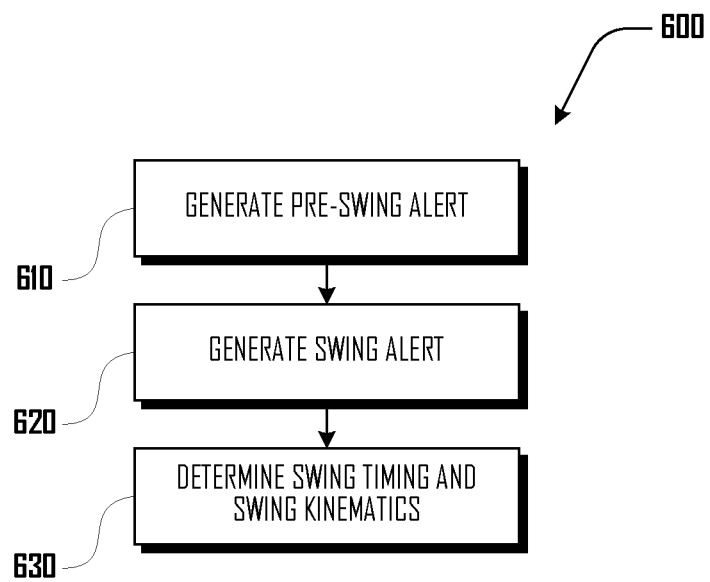
FIG. 6a illustrates a block diagram of a method of swing testing in accordance with an embodiment.

Turning to FIG. 6a, a method 600 of swing testing is illustrated, which beings at 610 where a pre-swing alert is generated. At 620, a swing alert is generated, and at 630, swing timing and/or kinematics are determined. In some embodiments, no ball 120 is pitched during swing testing and a batter 130 can be swinging in the air, or can be swinging at a stationary target at a hitting location target such as a ball 120 on a tee, a ball 120 suspended by a line, or the like.

In various embodiments, swing testing can be used to determine a time interval from when the swing alert is generated at 630, to when the bat 150 of the batter 130 hits a stationary target or when a portion of the bat 150 of batter 130 enters a hitting location target. Accordingly, during swing testing, the batter 130 being tested can be instructed to prepare to swing when the pre-swing alert is generated at 610, and then to swing the bat 150 to hit the stationary target at a hitting location target or swing the bat 150 in the air immediately when the batter 130 perceives the generated swing alert at 620. In other words, swing testing can determine for a given batter 130 a time interval that includes a delay between when a swing alert is generated at 620 to when the batter 130 initiates a swing of the bat 150 in response to the swing alert and hit a stationary target with the bat 150 or a portion of the bat 150 reaches a hitting location target. In various examples swing metrics can include a swing delay (e.g., time elapsed from swing alert to forward motion of bat 130); swing time/speed (e.g., time and speed of forward motion of the bat 150 to contact between the bat 150 and ball 120); and overall swing time (e.g., time from swing alert to contact between the bat 150 and ball 120).

In one example, a swing-time interval can be determined by starting a timer when the swing alert is generated at 620, with the timer being stopped based on a sound generated by the bat 150 hitting a stationary target such as a ball 120. In other words, a sound cue received by a microphone can be used to indicate an end-time of a swing for purposes of swing testing. In some embodiments, an end-time of a swing for purposes of swing testing can be determined based on processing visual data (e.g., from a camera) to determine when a bat 150 hits a target, has reached a certain position or orientation, or when a portion of the bat 150 reaches a hitting location target. In further embodiments, data from a bat device 440 can be used to determine when a bat 150 hits a target, has reached a certain position or orientation, or when a portion of the bat 150 reaches a hitting location target.

In various embodiments, a swing testing method 600 can be repeated a plurality of times to generate an average swing-time interval, which can provide for increased accuracy of the swing-time interval. Also, swing-time interval can be associated with a batter profile of a given batter 130. Accordingly, in some embodiments, a plurality of batter profiles can be generated with a different swing-time interval being associated with the plurality of batter profiles. Batter profiles can be stored at a swing alert device 200, user device 410, server 430 or other suitable device of a batting alert system 300. Having separate batter profiles for different batters 130 can be desirable for having customized settings such as a swing-time interval, and for recording activity of a given batter 130 separately from other batters 130.

In some embodiments swing testing can comprise a stride alert, where a stored stride time associated with the batter 130 is used. For example, a first stride alert can be generated to signal the batter 130 to stride into a launch position and a second swing alert can be generated to signal the batter 130 to swing. In some examples, once contact with the ball 120 is made, the event can be over and time is stored and/or displayed. As discussed herein, such a mode can be repeated to create an average. In various embodiments, times for multiple (pre-selected) locations can also be tested and stored for use in various testing and/or training modes.

In some embodiments, swing testing can include a pitcher 130 throwing or tossing a ball (e.g., a soft toss or slow front toss). Additionally, in some embodiments, a user can initiate a swing alert at a swing alert device 200 or other suitable device of a swing alert device network 300. For example, in one embodiment, swing testing can capture swing time in soft toss mode that includes a batter 130, a pitcher 110, and a third user that initiates a swing alert (e.g., by tapping a screen to generate a swing alert for the batter 130). In such an example, the pitcher 110 can toss a ball 120 to the hitter 130 and when the ball 120 arrives at the hitting location target, the third party taps the screen of the swing alert device 200, which generates an alert to the hitter 130 that alerts the batter 130 to swing as discussed herein. Once contact occurs between the bat 150 and ball 120, the event can be over and one or more swing times can displayed at the swing alert device 200. In some examples, a soft toss swing test mode can be used to collect swing time data for users who selected "Long Stride" in a stride calculator mode, or other suitable stride mode.

Such a swing test can be performed multiple times to create an average. Where the batter 130 has performed a swing test in other modes (e.g., hitting a ball 120 on a tee, hitting a ball 120 on a line, swing testing without a ball 120) stored swing times from one or more swing testing modes can be conflated to create an average of swing times from a plurality of swing tests from a plurality of swing test modes.

Figure 6B:
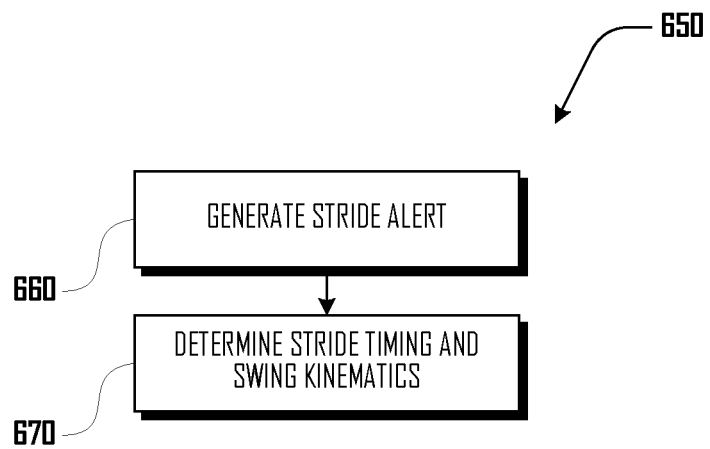
FIG. 6b, illustrates a block diagram of a method of stride testing in accordance with an embodiment.

Turning to FIG. 6b, a method 650 of stride testing is illustrated. The method begins at 660 where a stride signal is generated, and at 670, stride timing and/or swing kinematics are determined. For example, in various embodiments a stride testing can be used to determine the time that it takes a batter 130 to take a stride in preparation for a swing. In one example, a stride-time interval can be determined by starting a timer when the stride alert is generated at 660, with the timer being stopped based on a sound generated by the batter 130 when ending a stride (e.g., a front foot of the batter 130 contacting the ground). In some embodiments, an end-time of a stride for purposes of stride testing can be determined based on processing visual data (e.g., from a camera) to determine when a stride of a batter 130 has ended.

In further embodiments, data from a bat device 440, or other similar device worn by a user, or device disposed in a batting area, can be used to determine when a stride of a user has ended. For example, in one embodiment, a batter 130 can perform swing testing while standing on a force pad or plate, which can detect the position and force of the feet of the batter 130 on the ground during the a stride, which can be used to determine an end-time of a stride and/or stride kinematics as discussed herein. In various examples, no ball 120 is pitched during stride testing.

In various embodiments, a stride testing method 650 can be repeated a plurality of times to generate an average stride-time interval, which can provide for increased accuracy of the stride-time interval. Also, stride-time interval can be associated with a batter profile of a given batter 130 as discussed herein.

In various embodiments, stride testing can be configured to calculate the length of stride of a batter 130. In one example, there can be a plurality of selectable categories within a stride testing mode including: short, medium (e.g., 0.4 sec) or long (e.g., tap stride, long stride or high leg kick). In some examples, long stride can require a test mode using a tee or the like as described herein.

In some examples, for short and medium length strides, either the batter 130 or another user can initiate a testing drill with a screen tap. After a short delay, an alert can sent, signaling the batter 130 to stride into a launch position. When the batter 130 has arrived at the launch position, the screen can once again be tapped, stopping the clock. Multiple tests can be used to create an average, or a single test can also be stored for use in other modes.

Kinematics of a swing and/or stride can be determined in various suitable ways, including visually (e.g., via a camera) via one or more accelerometers, force sensors, or other suitable sensors as discussed herein. Kinematics can be visualized in some examples (e.g., via a user device) as a wire frame of a batter 130 to illustrate movement and orientation of joints of the batter 130 during a stride and/or swing. Kinematics of a swing and/or stride can be used for analyzing and improving the swing and/or stride of the user; for identifying a change in the swing and/or stride of a batter 130 over time; to determine when to provide subsequent swing and/or stride alerts, and the like.

In some embodiments, swing and/or stride testing can be performed by a swing alert device 200 and or swing alert device system 300 in the same configuration as when swing and/or stride alerts are provided in response to a ball 120 being pitched (e.g., performing the method 500 of generating a swing alert of FIG. 5). However, in further embodiments, a swing alert device 200 and or swing alert device system 300 can have a different configuration for one or both of swing and stride testing. For example, in some embodiments, the position of a swing alert device 200 or the position of one or more devices of a swing alert device system 300 can be changed for swing and/or stride testing compared to providing swing and/or stride alerts in response to a ball 120 being pitched. Additionally, in some examples, one or more devices can be added to a swing alert device system 300 for one or both of swing and stride testing compared to providing swing and/or stride alerts in response to a ball 120 being pitched. For example, devices such a bat device 440, or other similar device worn by a user, or device disposed in a batting area, can be used only during one or both of swing and/or stride testing.

Figure 7:
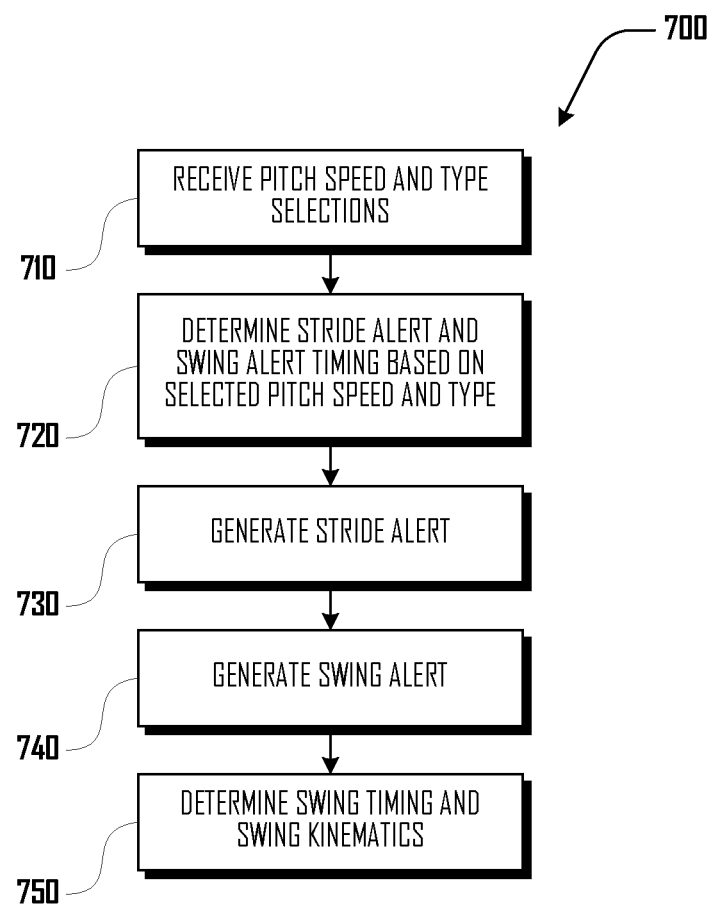
FIG. 7 illustrates a block diagram of a method of tempo training in accordance with an embodiment.

In various embodiments, a swing alert device 200 or swing alert device system 300 can provide for various suitable training modes or methods in addition to or alternatively to swing and/or stride alerts provided in response to a ball 120 being pitched (e.g., performing the method 500 of generating a swing alert of FIG. 5). For example, FIG. 7 illustrates an example tempo training method 700, which in some embodiments can occur without a ball 120 being pitched, but in some embodiments a batter 130 can strike a stationary target such as a ball 120 on a tee or a ball suspended by a line. The method 700 begins a 710, where pitch speed and/or pitch type selections are received, and at 720, stride signal and swing signal timing based on the selected pitch speed and/or type are determined.

For example, in some embodiments, pitch speed and/or pitch type selections can be input by a user; pitch speed and/or pitch type selections can be randomly generated by a swing alert device 200 or swing alert device system 300; pitch speed and/or pitch type selections can be provided based on a set of pitch speed and/or pitch type selections (e.g., a programmed training session, a representation of a portion of a previous baseball game; a representation of a specific pitcher 110); and the like.

Returning to the method 700, at 730 an alert signal is generated, and at 740, a swing alert is generated. At 750, swing timing and/or swing kinematics are determined. For example, in various embodiments, swing timing can be based on a time interval between one or both of the stride alert and/or swing alert and one or both of a stride and swing end time. Swing or stride end times can be determined in various suitable ways as discussed herein. For example, the sound of the bat 150 hitting a stationary target such as a ball 120 on a tee or line can be used to determine a swing end time.

Swing and/or stride kinematics can be determined in various suitable ways as discussed herein, including visually (e.g., via a camera), via an accelerometer, force sensor, and the like. Swing and/or stride kinematics from one or more tempo training sessions can be used to generate reports for a batter 130 to provide feedback to the batter 130 or other users on the swing of a batter 130. For example a set of tempo training data can be generated, stored, or shared among one or more suitable devices of a swing alert system 300 including one or more swing alert device 200, user device 410, server 430 or other suitable device of a batting alert system 300 (See FIG. 4). For example, in one embodiment, raw data from tempo training can be sent to a user device 410 or server 430 and processed by the user device 410 or server 430 to generate reports.

Figure 8:
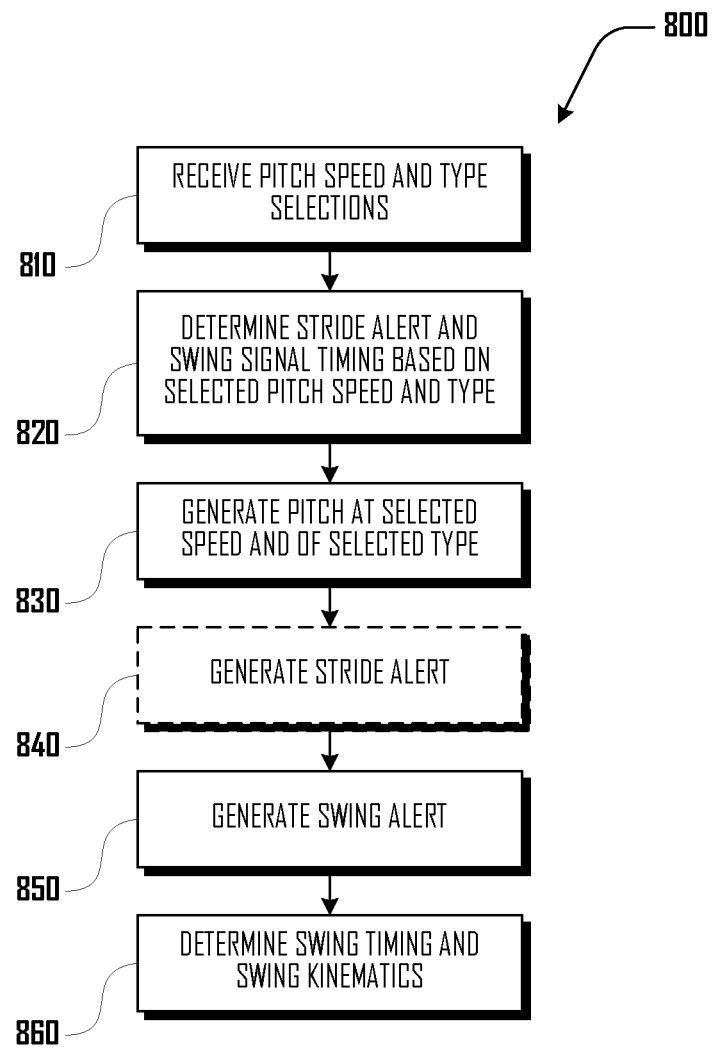
FIG. 8 illustrates a block diagram of a pitch training method in accordance with an embodiment.

Turning to FIG. 8, an example of pitch training method 800 is illustrated, which in some embodiments can be performed with a swing alert system 300 comprising a pitching machine 420. The method 800 begins at 810 where a pitch speed and/or pitch type is received, and at 820, a stride alert and/or swing alert timing based on the selected pitch speed and/or pitch type is determined. For example, in some embodiments, pitch speed and/or pitch type selections can be input by a user; pitch speed and/or pitch type selections can be randomly generated by a swing alert device 200 or swing alert device system 300; pitch speed and/or pitch type selections can be provided based on a set of pitch speed and/or pitch type selections (e.g., a programmed training session, a representation of a portion of a previous baseball game; a representation of a specific pitcher 110); and the like.

A stride alert and/or swing alert timing based on the selected pitch speed and/or pitch type can be determined as discussed herein. For example, with the pitch speed and/or pitch type being known, and with a distance between a pitching machine 420 and hitting location target being known, a determination can be made of a time it will take for a pitched ball 120 to reach the hitting location target based on a selected speed and pitch type of the ball 120. In other words, the pitch type can be used to determine a flightpath 140 of the pitched ball 120 and the speed and determined flightpath 140 can be used to determine a time that the pitched ball 120 will take to travel along the flightpath 140 from the initiation of the pitch to the hitting location target. Accordingly, stride alert and/or swing alert timing can be determined based on the initiation of a pitch by a pitching matching 420.

Returning to the method 800, at a pitch corresponding to the selected pitch speed and/or pitch type can be generated at 830 (e.g., by a pitching machine 420). At optional step 840, a stride alert can be generated, and at 850, a swing alert can be generated. Swing timing and/or swing kinematics can be determined at 860. For example, in various embodiments, swing timing can be based on a time interval between one or both of the stride alert and/or swing alert and one or both of a stride and swing end time. Swing or stride end times can be determined in various suitable ways as discussed herein. For example, the sound of the bat 150 hitting a stationary target such as a ball 120 on a tee or line can be used to determine a swing end time.

Kinematics of a swing and/or stride can be determined in various suitable ways, including visually (e.g., via a camera) via one or more accelerometers, force sensors, or other suitable sensors as discussed herein. Kinematics can be visualized in some examples (e.g., via a user device) as a wire frame of a batter 130 to illustrate movement and orientation of joints of the batter 130 during a stride and/or swing. Kinematics of a swing and/or stride can be used for analyzing and improving the swing and/or stride of the user; for identifying a change in the swing and/or stride of a batter 130 over time; to determine when to provide subsequent swing and/or stride alerts, and the like.

In various embodiments, a swing alert device 200 or a device of a swing alert system 300 (e.g., a user device 410, pitching machine 420, and the like), can comprise an interface that displays various suitable data including, captured motion data one or more sensors, including swing speed, hand speed, swing delay, projected ball speed, distance of ball travel, distance of ball travel when an alert is sent to the batter 130 to act, and the like.

An interface can display a swing path depiction from a captured event that can comprise of an illustration of a bat path of travel and bat orientation, coupled with swing metrics of the batter 130, captured ball metrics, and the like.

The interface can further display a percentage of motion efficiency, a corrected and or suggested path of greater efficiency, and the like.

In some examples, a swing alert device 200 or swing alert system 300 can be configured to automatically shut down sensors after a designated number of attempts in a given operating mode (e.g., game play mode, swing alert mode, stride alert mode, swing test mode, stride test mode, tempo training mode, and the like) and switching to a rest or report mode for displayed analysis of swing and pitch metrics on the communication interface's display screen.

In further examples, a swing alert device 200 or swing alert system 300 can be configured to perform a "Test Mode" function, wherein one or more sensors collect and store a designated number of swings creating an aggregate of batter's swing speed, and swing delay metrics to be used in a game play mode. A swing alert device 200 or swing alert system 300 can be configured to perform Game Play Mode function wherein captured swing delay metrics are stored, utilized and coupled with captured projected (pitched) ball velocity and orientation metrics to be processed, then sending an audio, visual or vibrational alert to the batter 130 signaling when the batter 130 should swing the bat 150. In some examples, a designated number of attempts can be performed by the user while in the Game Play mode, after which, sensors can be shut down and batter 130 can be directed to rest. In further examples, a swing alert device 200 or swing alert system 300 can be configured to perform a Rest Mode for a designated non-zero period of time at which time the communication interface can display captured data of event(s) for analysis before returning to Test Mode.

For example, such a Test Mode can be desirable to simulate typical batting conditions of a hitting session of a baseball game where a batter 130 is subjected to only a certain number of pitches before striking out, getting on base, or otherwise ending the hitting session. In other words, the swing alert device 200 or swing alert system 300 can be configured to prevent the batter 130 from being subjected to a large number of pitches that would be abnormal for a typical hitting session of a baseball game such that pitchers are only tested within a conventional stamina range.

In various swing testing, practice or training modes, manually inputted pitch speeds and pitch distances (e.g., selected based on age/level of play) can be selected and the distance the user, based on their stored swing metrics, would have to attack the pitched ball can be displayed. For example, in some embodiments, a user can select from college baseball and professional baseball to populate variables such as pitch distance, pitch speed, pitch type, and the like. Average distance of release of pitch can be displayed (e.g., a distance of 55 ft). Selected speed can be selected and displayed (e.g., 90 mph).

In some examples, a user can indicate a position of a batter 130 relative to a batter's box, home plate 301 or other monument via a user interface of swing alert device 200 or other suitable device. For example, a user can position foot icons in a batter's box displayed in an interface by touching a screen where desired. A calculation of pitch release distance to point of contact can then be used to determine time from release to contact point. Additionally, contact point within strike zone can also be selected via an interface (e.g. inside, outside, middle). A swing time of a batter can be applied and the determined or defined distance of attack, which can be displayed for user analysis.

In various embodiments, the characteristics of a set of virtual or real pitches can be selected in various suitable ways. For example, selected pitch variables can include preprogramed pitch speeds (e.g., user selected, randomly selected, and the like); choice of multiple pitches delivered by randomly timed swing alerts to simulate at bats (feel training); and the like. A preselected number of pitches can be optioned in various modes (e.g., up to 10 in some examples). In one example, a first alert can be generated, signaling the batter 130 to stride into the launch position of the batter 130, which can be stored by a device or system. A second alert can be generated at various suitable random times (speeds) for timing "feel" training. Pitch speeds can be displayed in a post analysis mode. Preprogramed alert times based on various characteristics can be selected for practice or training sessions (e.g., age, level of play, and the like).

In various swing testing, practice or training modes a user, swing alert device 200 or other suitable device of a swing alert system 300 can capture swings using a camera (e.g., via video). In some examples, capturing images with a high frame rate to provide for slow-motion playback can be desirable. In some examples, a time code can display in a video or images. Swing delay, bat speed, overall swing time, and the like, can be displayed for visual analysis.

Different mechanical batting approaches can be stored and compared allowing user to, for example, select a most comfortable and efficient swing and/or swing path to achieve desired results. Such mechanical batting approaches can be stored at swing alert device 200 or suitable device of a swing alert system 300 such as a user device 410, server 430, or the like. In various embodiments, a subscriptions service can be used by a batter 130 or other user to store batter metrics of one or more batter 130.

As discussed herein, swing and stride times can be tracked during swing testing, stride testing and practice or training modes. In various examples, it can be desirable to display swing and/or stride times, including highlighting swing and stride times that are above or below a threshold of an average swing and stride time. In other words, significant swing and/or stride time changes (+ or −) can be highlighted to alert user to such deviations compared to an average. In some embodiments, when comparing swing paths with exit velocity and launch angle, it can be desirable to determine the spin rate of a ball 120, given that in some examples, a lower trajectory with a greater spin rate will travel farther than analysis of just exit velocity and launch trajectory (e.g., analogous to a golf club driver).

In various modes (e.g., a "game mode") metrics of a pitched ball 120 can be captured in real-time and merged with stored swing time metrics of a batter 130. Distance of ball release to contact point (contact between bat 150 and ball 120) can be captured by a suitable device (e.g., a swing alert device 200) or manually inputted by a user. Once the batter 130 has achieved launch position of a stride, an alert can be sent signaling the batter 130 to swing, based on the swing metrics of the batter 130 (e.g., overall swing time) and the metrics of the pitched ball 120. While in some examples it can be desirable to limit the hitter 130 to perform such task no more than 8 times within a batting session before taking a rest period, in various embodiments a swing alert device 200 or swing alert system 300 can feed back live swing time data and can adjust the swing alert based on real or anticipated fluctuations in the swing time of a batter 130, which in some examples can be caused by fatigue. In other words, the swing time of a batter can become successively slower during a batting session, and in some examples, a swing alert device 200 or swing alert system 300 can account for such fatigue by increasing swing time offset and/or stride time offset after successive swings in a hitting session.

In some embodiments, one or more sensors (e.g., a camera) of a swing alert device 200 or swing alert system 300 can capture and store swing motion for display and analysis. In one embodiment, a display of a swing alert device 200 or swing alert system 300 can present swing time broken up into various suitable categories such as overall swing time including swing time and swing delay (e.g., time between alert and completion of the swing event); swing time after delay; and the like. In some examples, swing speed can be calculated and displayed for user analysis for overall swing time and swing speed after delay. Overall swing time can be calculated in some examples by a running clock that begins when swing alert is generated and that stops when the device or system recognizes that a completion of the swing event has occurred (e.g., the bat 150 hitting the ball 120). The device or system can identify a collision of a bat 150 and ball 120 in various suitable ways such as utilizing one or more cameras, one or more microphones, by an accelerometer of a bat device 440 indicating the ball 120 has been struck by the bat 150.

In various embodiments, baseball statistics data (e.g., Sabermetrics data) can be used to generate swing and/or stride practice sessions based on the metrics of offensive and/or defensive players. For example, utilizing defensive Sabermetric analytics of the Houston Astros, the Los Angeles Dodgers can apply such metrics to practice sessions of a batter 130 of the Dodgers to prepare the batter 130 for an upcoming series with the Houston Astros. The statistics data of a batter 130 and stored swing metrics data can be applied and success/failure ratios for the batter 130 can be created based on the opposition's pitcher/fielder metrics as they pertain to the batter 130. Such statistics data can be stored locally at a swing alert device 200 or device of a swing alert system 300 or can be stored remotely and accessed by such a device or system (e.g., a Sabermetrics service)

In various embodiments, a plan or approach can be created based on a pitch count (e.g., balls and strikes during and at bat of a baseball game) and based on a success/failure ratio of a given batter 130 based on specific pitches. Based on such a plan or approach, an alert or no-swing alert can be generated based on these metrics in specific counts (e.g., 2 balls, 1 strike, and the like). Additionally, in some embodiments, a batter 130 can practice hitting pitches of a historically lower success ratio by receiving an alert when to correctly swing at a pitch to improve their success ratio for such a pitch. The predicted outcome of the event after the batter 130 hits the pitched ball 120 can be displayed for analysis.

Utilizing one or more cameras, of a swing alert device 200 or device of a swing alert system 300, moving pitch data can be collected and processed for display or for use with various suitable programs or functions. The pitch data can include ball release distance, ball travel distance to an intersection point between the bat 150 and the pitched ball 120, pitched ball speed, pitch orientation, pitch vector, angle of ball travel, ball spin rotation, ball spin rate (RPM), pitch type (e.g., two-seam fastball, four-seam fastball, change up curve slider), and the like. In various embodiments, a swing alert device 200 or one or more devices of a swing alert system 300 can be configured to learn and then predict where a ball 120 will arrive and predict a desirable time to alert hitter to act upon the ball (e.g., swing or stride) based on the predicted arrival of a ball 120 in relation to a strike zone and/or the position of the batter 130, and/or position of a bat 150 relative to the strike zone.

Stride timing practice sessions can be created utilizing a swing alert device 200 or one or more device of a swing alert system 300 by teaching batter 130 to create a swing time through the process of preparing to swing. For example, preparing to swing can include separation, loading, striding, getting into a launch position, stacking, getting into a power position, creating tempo, and the like. An alert can be generated for the batter 130 indicating when to "load" (e.g., a stride alert). A predetermined time can elapse before a subsequent alert is generated for the batter 130 indicating when the batter 130 should swing. Such a pause between stride and swing alerts can be defined as tempo. In some examples, a user can select a stride length as a preference such as a long stride, medium stride, short stride, or the like. One or more practice sessions can be set up with random swing alert times; with specific swing alert times based on selected pitch speed and/or pitch distance of travel; and the like. Stored swing metrics of a batter 130 can be applied to such practice sessions. In various examples, practice sessions can be created using stored swing metrics data of a given batter 130 and pitched ball data to practice foul ball swing timing.

Various types of data such as user swing metrics, pitcher, fielder and ball metrics can be displayed before and after an event for user analysis on a video screen or other suitable display.

A simulated game with live interaction by one or more batters 130 can be played using the systems and methods discussed herein, including storing the results of at bats of the one or more batters 130. For example, such a simulated game can be similar to the interaction between a user and a video game but using a live ball 120 and one or more batters 130.

In some examples, utilizing a pitching machine 420 (see FIG. 4) configured to throw random or programed pitches, a batter 130 can practice hitting a variety of pitches of various types and speeds. The swing metrics of the batter 130 along with collected live pitch metrics can be applied and a swing alert device 200 or swing alert system 300 can indicate when the batter 130 should act upon the pitched ball 130 based on those metrics (e.g., begin a stride and/or swing).

Swing metrics data and/or practice session result data can be stored for analysis and comparison to quantify batter performance and improvements. Stored swing time averages can be compared with swing times of new session. In some examples, if swing times change outside of a predetermined plus or minus threshold, an alert message can be presented indicating time change in comparison to the stored average.

In various examples, analysis can consider stored swing metrics and swing orientation and apply an efficiency rating of a swing path with suggested corrections, which can be depicted visually (e.g., overlaid) on a display of a swing alert device 200 or one or more device of a swing alert system 300. Corrections can be objective, based on efficiency and economy of motion and other facts of science.

In some examples, an artificial neural network or other suitable type of artificial intelligence or machine vision can be utilized to identify balls 120, distance of a pitch ball 120 from a predetermined location, (e.g., the intersection point between the bat 150 and the ball 120), the velocity of the ball 120 (or other projectile), the spin velocity of a ball 120 (rpms), the laces of a ball 120, orientation of laces of a ball 120, a flightpath the ball 120 is traveling on, the predicted arrival location within the predetermined destination (e.g., with a strike zone—or not in the strike zone), and the like. Such artificial intelligence and/or machine vision can be used to generate an alert for the hitter 130 indicating when to swing, or whether or not to swing, or the like, based at least in part on stored user analytics of the batter 130.

An alert can be generated signaling the batter 130 when to swing, delivered by an audio alert, which can be a sound of any suitable kind including but not limited to a tone, the batter's own prerecorded and stored voice, an audio message, or the like. A wired or wireless headphone, the speaker system of a mobile phone, tablet computer or standalone device can used to generate a swing alert and/or stride alert. In various embodiments, an alert can be generated signaling the batter 120 to swing and/or begin a stride, with such an alert being generated by a vibration of an offset motor, (e.g., a pager motor), that can be part of a bat motion sensor device (e.g., a bat device 440), with such a haptic alert indicating to the batter 130 to swing the bat 150. In some examples, a vibrational alert can be triggered via a radio signal to a smart band or smart watch worn by the user that generates the vibrational alert.

In further embodiments, an alert can be generated for the batter 130 signaling when to swing and/or initiate a stride, with such an alert being delivered by a visual cue. For example, utilizing smart glasses, stereoscopic augmented reality eyewear, Google glasses, virtual reality eyewear, or the like, the ball 120 or other projectile can appear to flash or change color, signaling the batter 130 when to swing the bat 150.

In various embodiments, a swing alert device 200 or one or more device of a swing alert system 300, using the stored swing metrics of a given batter 130, can utilizes a radar device to capture pitched ball metrics and conflate stored swing metrics of the batter 130 with the captured pitched ball metrics. An alert can be generated for the batter 130 to swing the bat 150 and/or being a stride based on these metrics.

As discussed herein, in some embodiments, swing time metrics and/or stride time metrics can be collected including the use of a pitched ball 120, a non-pitched ball 120, or without use of a ball 120. For example, various functions do not relate to an actual pitched ball 120 but rather a simulated event such as hitting a ball 120 placed on a batting tee or swinging and/or striding without a ball 120 being present. Similarly, as discussed herein, in some embodiments, swing alert and/or stride alert functions can be performed including a pitched ball 120, including a non-pitched ball 120, or without use of a ball 120. For example, a stride alert function can occur without a pitched ball, utilizing a batting tee, a softly tossed ball 120, or the like.

In some examples, swing time metrics and/or stride time metrics can be captured without a device, wholly captured by various functions of a mobile phone or tablet or computer, such as the built in or network connected camera and microphone. Additionally, in some examples, all swing metrics and/or stride metrics can be stored and called upon for use in pitched ball scenarios.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process of operating and controlling a preburner, a preburner system, or a rocket engine, such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU executes some of the instructions while a graphics processor unit executes other instructions. In an embodiment, different components of a computer system have separate processors, and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

We claim:

1. A method of measuring a swing of a batter using a swing capture system having one or more sensors, the method comprising:
   providing an alert instructing the batter to swing a bat toward an object;
   detecting, via the one or more sensors, a forward motion of the bat towards the object;
   detecting, via the one or more sensors, a contact between the bat and the object;
   measuring a first period of time between the alert and the contact between the bat and the object, wherein the first period of time corresponds to an overall swing time of the batter;
   measuring a second period of time between an initiation of the forward motion of the bat towards the object and a contact between the bat and the object, wherein the second period of time corresponds to a swing time of the batter; and
   determining a swing delay time for the batter, wherein the swing delay time is equal to time elapsed between the alert and the initiation of forward motion of the bat.

2. The method of claim 1 wherein the swing delay time corresponds to a reaction time and/or a non-forward motion of the bat.

3. The method of claim 1 wherein the object is a ball, and wherein the ball is positioned on a batting tee.

4. The method of claim 1, further comprising calculating an average overall swing time, wherein the average overall swing time is an average of a plurality of overall swing times.

5. The method of claim 1 wherein the alert is a swing alert, and wherein the method further comprises:
   providing a stride alert instructing the batter to stride before providing the swing alert; and
   determining a stride time of the batter by measuring a third period of time between the first stride alert and the batter ending the stride.

6. The method of claim 1, further comprising determining, based on the overall swing time for the batter, when the batter must initiate their swing to hit a ball pitched from a predetermined distance and travelling at a predetermined velocity.

7. A computer-readable storage medium storing instructions that, when executed by a computing system, cause the computing system to perform operations for measuring a swing of a batter, the operations comprising:
   directing an alert generation device to provide an alert instructing the batter to swing;
   receiving a first signal from one or more sensors operably coupled to the computing system indicating detection of an initiation of a forward motion of a bat;

receiving a second signal from the one or more sensors indicating detection of a contact between the bat and an object;

determining a swing delay time of the batter based on time elapsed between the alert instructing the batter to swing and the receipt of the first signal indicating the detection of the initiation of forward motion of the bat towards the object;

determining a swing time of the batter based on time elapsed between the receipt of the first signal indicating the detection of the initiation of the forward motion of the bat towards the object and receipt of the second signal indicating the detection of the contact between the bat and the object; and determining an overall swing time for the batter based on time elapsed between the alert instructing the batter to swing and the receipt of the second signal indicating the detection of the contact between the bat and the object.

8. The system of claim 7 wherein the object is a ball.

9. The system of claim 7 wherein the swing delay time corresponds to a reaction time of the batter and/or a non-forward motion of the bat.

10. The system of claim 7 wherein the operations further comprise calculating an average overall swing time, wherein the average overall swing time is an average of a plurality of overall swing times.

11. The system of claim 7 wherein the operations further comprise displaying the swing delay time, the swing time, and the overall swing time on a display interface.

12. The system of claim 7 wherein the alert is a swing alert, and wherein the operations further comprise determining a stride time of the batter by measuring time elapsed between a stride alert instructing the batter to stride and the batter ending the stride.

13. The system of claim 7 wherein the operations further comprise determining when the batter must initiate their swing to hit a ball pitched from a predetermined distance and travelling at a predetermined velocity based at least in part on the overall swing time of the batter.

14. The method of claim 1 wherein the one or more sensors include an accelerometer, a gyroscope, or a magnetometer.

15. The method of claim 1 wherein measuring the first period of time includes starting a timer when the alert is provided and stopping the timer when the contact between the bat and the object is detected.

16. The system of claim 7 wherein the one or more sensors include an accelerometer, a gyroscope, or a magnetometer.

17. A method for measuring a swing of a batter using a swing capture system having one or more sensors, the method comprising:

directing an alert generation device to generate an alert instructing the batter to swing a bat at a ball;

starting a first timer when the alert generation device generates the alert; detecting, via the one or more sensors, an initiation of a forward motion of the bat;

starting a second timer when the one or more sensors detect the initiation of the forward motion of the bat;

detecting, via the one or more sensors, contact between the bat and the ball;

in response to detecting the contact between the bat and the ball, stopping the first timer and the second timer;

wherein the time captured on the first timer corresponds to an overall swing time of the batter, and wherein the time captured on the second timer corresponds to a swing time of the batter; and determining a swing delay of the batter, wherein the swing delay of the batter is equal to time elapsed between the alert and the initiation of forward motion of the bat.

18. The method of claim 17 wherein the one or more sensors include an accelerometer, gyroscope, or magnetometer.

19. The method of claim 17 wherein the one or more sensors include an accelerometer coupled to the bat and a microphone.

* * * * *